L. W. CLOSE.
SECTIONAL WHEEL RIM.
APPLICATION FILED NOV. 11, 1916.
1,254,120.
Patented Jan. 22, 1918.
2 SHEETS—SHEET 1.
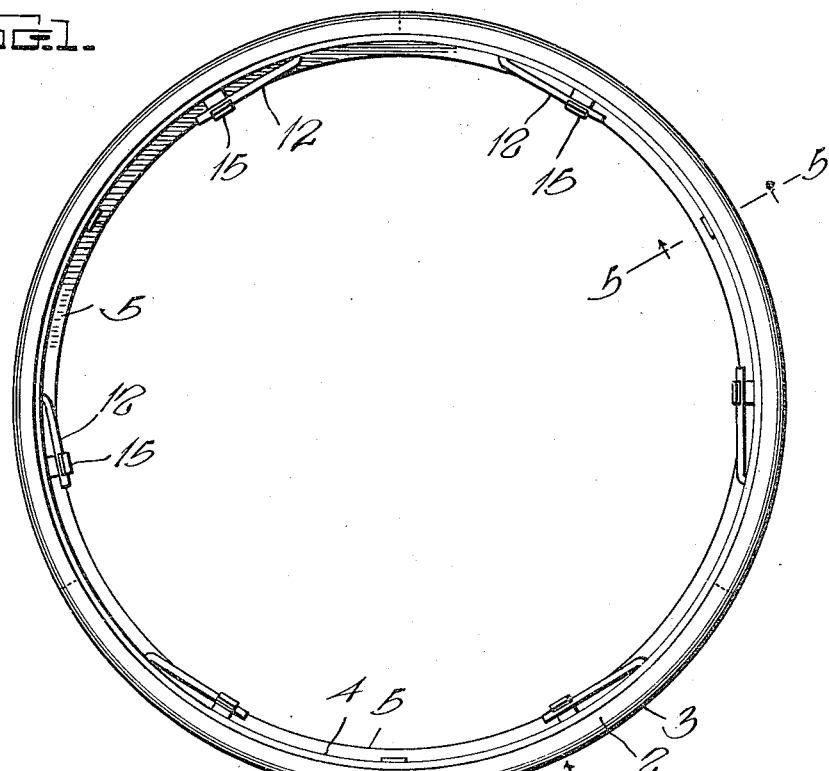
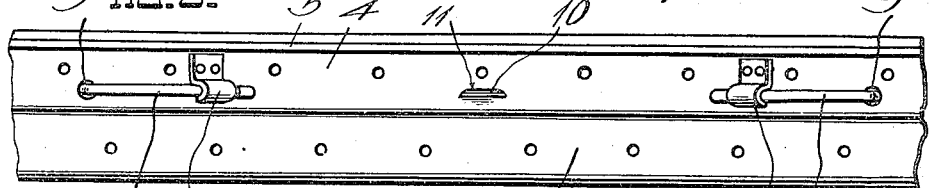
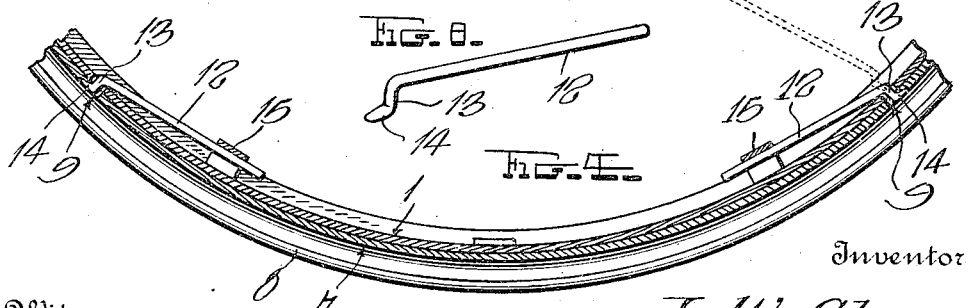
Witness
H. Woodard
Inventor
L. W. Close
By H. B. Willson & Co.
Attorneys L. W. CLOSE.
SECTIONAL WHEEL RIM.
APPLICATION FILED NOV. 11, 1916.
1,254,120.
Patented Jan. 22, 1918.
2 SHEETS—SHEET 2.
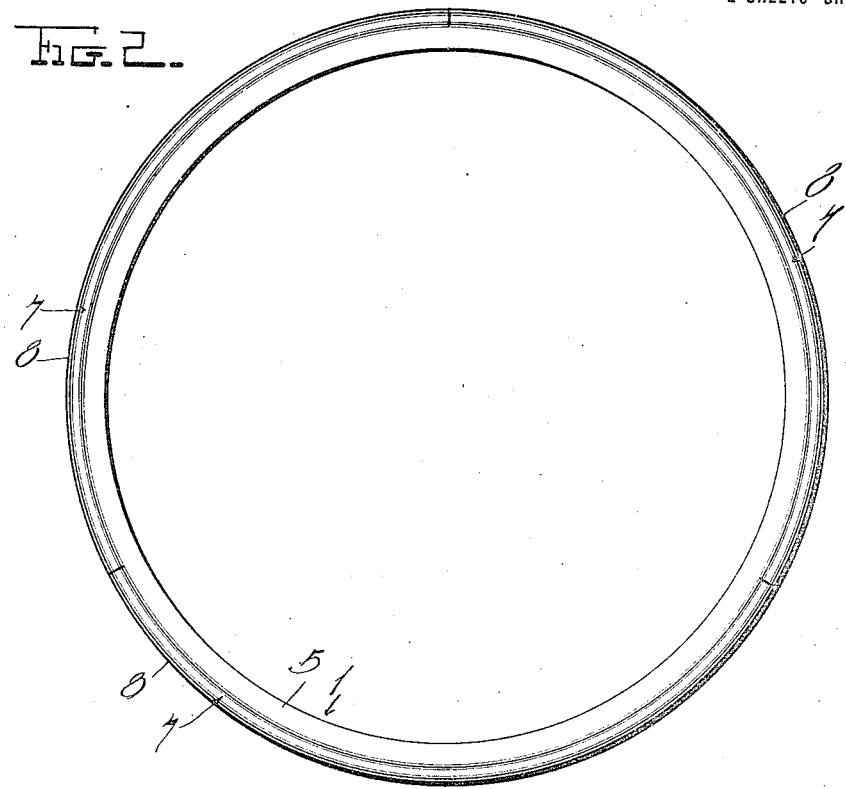
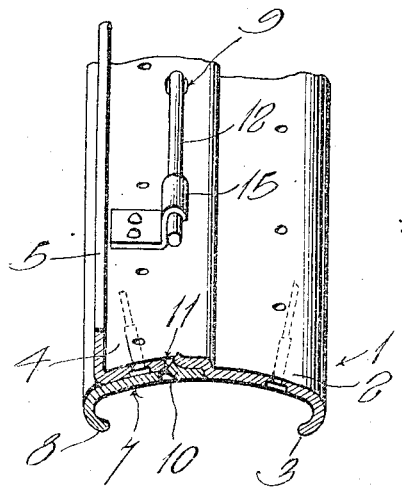
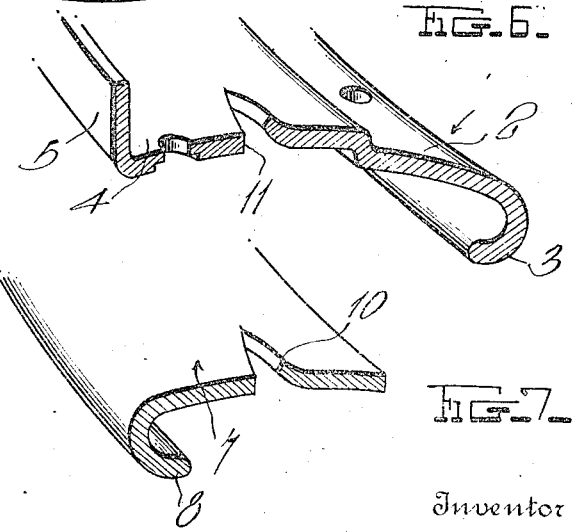
Witness
H. Woodard
Inventor
L. W. Close
By H. B. Willson & Co.
Attorneys

UNITED STATES PATENT OFFICE.

LOYD WALTER CLOSE, OF MANHATTAN, MONTANA.

SECTIONAL WHEEL-RIM.

1,254,120.   Specification of Letters Patent.   Patented Jan. 22, 1918.

Application filed November 11, 1916. Serial No. 130,742.

*To all whom it may concern:*

Be it known that I, LOYD WALTER CLOSE, a citizen of the United States, residing at Manhattan, in the county of Gallatin and State of Montana, have invented certain new and useful Improvements in Sectional Wheel-Rims; and I do declare the following to be a full, clear, and exact description of the invention, such as will enable others skilled in the art to which it appertains to make and use the same.

My invention aims to provide a simple and inexpensive yet efficient sectional rim for motorcycles or wire-spoked automobile wheels, the device being so constructed as to permit tires to be changed with ease.

With the foregoing general object in view, the invention resides in certain novel features of construction and in unique combinations of parts to be hereinafter fully described and claimed, the descriptive matter being supplemented by the accompanying drawings which constitute a part of this application, and in which:

Figures 1 and 2 are elevations of the opposite sides of the rim;

Fig. 3 is an elevation of the inner face of the rim;

Fig. 4 is a longitudinal sectional view;

Fig. 5 is a vertical transverse section on the plane indicated by the line 5—5 of Fig. 1;

Fig. 6 is a perspective view of a fragment of one of the fixed rim sections;

Fig. 7 is a perspective view of a portion of one of the removable rim sections; and Fig. 8 is a similar view of one of the retaining members used for holding the removable rim sections in contact with the fixed sections.

Throughout the several views, the numeral 1 has reference to the fixed section of the improved rim, said section being of two diameters as shown, the outer edge of the larger diameter 2 being curled to provide the usual bead-engaging ring 3, while the smaller diameter 4 constitutes a continuous flange whose outer edge is directed inwardly as indicated at 5 for reinforcing purposes.

As indicated in Figs. 5 and 6, the spokes on one side of the wheel are anchored at their outer ends in the diameter 2, while the spokes for the other side of the wheel are secured to the smaller diameter. This showing is for illustrative purposes only, however, and the spokes may be secured to the rim in any preferred manner.

A plurality of removable arcuate rim sections 7 having bead-engaging flanges 8 are disposed end to end around the flange 4 in contact with the outer face thereof, said flange and the removable sections having alined openings 9 near the ends of said sections for the reception of retaining members which hold said sections in operative position. The intermediate portions of the sections 7 are stamped inwardly to provide stop shoulders 10 which abut other shoulders 11 formed by the edges of slots stamped in the smaller circumference or flange 4 of the rim section 1, these shoulders 10 and 11 coöperating to prevent lateral shifting of the sections 7.

The retaining members above mentioned are designated broadly by the numerals 12, and each of said members if formed of a single metal rod or bar bent laterally at one end to provide a bolt 13 for reception in the alined openings 9, the free end of said bolt being in turn bent laterally away from the body of the member 12 to provide a nose 14 to prevent removal of the bolt 13 until canted within the openings 9 as indicated in dotted lines in Fig. 4. As also shown clearly in this figure, the several noses 14 are countersunk in the openings 9 of the rim sections 7 so as to interfere in no manner with the tire.

The body portions of the members 12 extend along the inner face of the flange 4 and the ends thereof remote from the bolts 13 are sprung into hook-like keepers 15 which are secured to said flange and open toward one edge thereof. This simple construction retains the members 12 in operative position until they are sprung from the keepers 15, and when this has been done said members may be shifted to dispose the bolts 13 at an angle to permit the noses 14 thereof to allow withdrawal of said bolts from the openings 9. This having been done, the sections 7 can be readily removed by inserting a screw driver or the like between them and the flange 4 to disengage the stop shoulders 10 and 11.

From the foregoing taken in connection with the accompanying drawings, the construction and manner of operation of the invention will be clear and it will be observed that regardless of the extreme simplicity of the device, it will be highly efficient and durable. For these reasons the construction shown constitutes the preferred form of the rim, but it is to be understood that within the scope of the invention as claimed numerous minor changes might be made without sacrificing the principal advantages. For instance, although the members 12 will by preference be constructed of metal rods, they might well be formed of flat bars.

I claim:

1. A wheel rim including a fixed rim section and a removable section in overlapping relation and having alined openings, a keeper carried by said fixed section at a point spaced longitudinally from the opening thereof, and a removable retaining member formed of a single length of metal whose body extends along the fixed section and is bent laterally at one end to form a bolt passing through said openings, the free end of said bolt being bent laterally away from said body to form a nose to prevent withdrawal of the bolt until canted in the openings and said body being removably sprung into said keeper to prevent such canting until released.

2. A wheel rim comprising a fixed annular section of two diameters, the smaller diameter constituting a continuous laterally extending flange, a plurality of removable arcuate rim sections disposed end to end and positioned on the outer face of said flange, said sections being flush with the larger diameter of the rim, coacting shoulders on the flange and removable sections for preventing lateral shifting of the latter, and releasable means independent of said shoulders for drawing said sections into tight contact with and holding them against said flange.

3. A wheel rim comprising a fixed annular section of two diameters, the smaller diameter constituting a continuous laterally extending flange, a plurality of removable arcuate rim sections disposed end to end and resting on the outer face of said flange, said sections being flush with the larger diameter of the rim, coacting stop shoulders stamped from said flange and removable rim sections to prevent lateral shifting of said removable sections, and releasable means for drawing said sections into tight contact with and holding them against said flange.

In testimony whereof I have hereunto set my hand in the presence of two subscribing witnesses.

LOYD WALTER CLOSE.

Witnesses:
ERNEST A. PETERSON,
RICHARD BON.

Copies of this patent may be obtained for five cents each, by addressing the "Commissioner of Patents, Washington, D. C."